(12) United States Patent
Monson et al.

(10) Patent No.: US 6,578,835 B2
(45) Date of Patent: Jun. 17, 2003

(54) CROSS ELASTOMER MOUNT

(75) Inventors: Robert James Monson, St. Paul, MN (US); Scott J. Benjamin, Lakeville, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/155,494

(22) Filed: May 24, 2002

(65) Prior Publication Data

US 2002/0149142 A1 Oct. 17, 2002

Related U.S. Application Data

(62) Division of application No. 09/779,729, filed on Feb. 8, 2001.

(51) Int. Cl.[7] ................................................. F16M 1/00
(52) U.S. Cl. ..................... 267/136; 267/160; 267/141; 188/379
(58) Field of Search ................................. 267/136, 139, 267/140, 141, 153, 160, 292, 140.11, 152; 188/379, 380; 248/560, 618, 621, 632, 634, 636, 638

(56) References Cited

U.S. PATENT DOCUMENTS

| | | | | | |
|---|---|---|---|---|---|
| 3,563,525 A | * | 2/1971 | Narabu | ...................... | 267/140 |
| 3,945,628 A | * | 3/1976 | Halwes | ...................... | 267/152 |
| 3,948,500 A | * | 4/1976 | Korbuly et al. | ............. | 267/140 |
| 4,059,254 A | * | 11/1977 | Fielding-Russel et al. | .. | 267/140 |
| 4,319,539 A | * | 3/1982 | Fujii et al. | ................... | 267/140 |
| 4,458,862 A | * | 7/1984 | Mouille et al. | | |

* cited by examiner

*Primary Examiner*—Jack Lavinder
*Assistant Examiner*—Mariano Sy
(74) *Attorney, Agent, or Firm*—Patrick M. Hogan; Glenn W. Bowen

(57) ABSTRACT

A cross elastomer mount comprising a body composed of an elastomer and having a plurality of legs, a first platform for supporting a first member and a second platform for supporting a second member, a plurality of rigid platform arms pivotally attached to the platforms, and a plurality of hinges pivotally attaching the rigid platform arms to the legs of the cross elastomer mount whereby the plurality of legs bow or arc under a shock and vibration force to allow the cross elastomer mount to attenuated the forces while providing a tension and shearing resistance to the shocks and vibrations.

16 Claims, 3 Drawing Sheets

CROSS ELASTOMER MOUNT

This application division, of application number 09/779,729 filed Feb. 8, 2001, (status, abandoned, pending, etc.).

FIELD OF INVENTION

This invention relates generally to shock isolators and more specifically to a cross elastomer mount.

BACKGROUND OF THE INVENTION

Generally, the shape and configuration of elastomeric isolators have a significant effect on the shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,776,720. These elastomeric isolators are typically attached to a housing to protect equipment within the housing from the effects of shocks and vibrations.

Generally, the shape and configuration of elastomeric isolators have a significant effect on the A shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,766,720. These elastomeric isolators are typically attached to a housing to protect equipment within the housing from the effects of shocks and vibrations.

In general, if the elastomeric isolators are positioned in the shear or tension mode as opposed to an axial compression mode the elastomeric isolators provide better shock and vibration attenuating characteristics in response to dynamic forces due to shocks and vibrations. Unfortunately, elastomeric isolators, which operate in a shear or tension mode or in the axial compression mode, can generally not be placed beneath a housing to provide static support to the housing without substantially effecting the shock and vibrational attenuation characteristics of the elastomeric isolators. Consequently, to provide static support for a housing, as well as effective shock and vibrational attenuation characteristics the elastomeric isolators, which operate in the shear or tension mode, are generally placed along side or above a housing so that the elastomeric isolators can function in a shear or tension mode while supporting the static weight of the housing. The positioning in a shear or tension mode can require placing matching elastomeric isolators on each side of the housing. In contrast, the present invention provides an elastomeric isolator that provides axial offset compressive support for a housing. As the present invention does not require pairing with other elastomeric isolators a single elastomeric isolator can be placed beneath a housing to provide static support for the housing through an axial offset compressive axis white at the game time allowing the elastomeric isolator to retain the necessary dynamic attenuation characteristics to thereby effectively reduce shocks and vibrations to the housing.

SUMMARY OF THE INVENTION

Briefly, the invention comprises a cross elastomer mount having a body composed of an elastomer and having a plurality of legs, a first platform for supporting a first member and a second platform for supporting a second member, a plurality of rigid platform arms pivotally attached to the platforms, and a plurality of hinges pivotally attaching the rigid platform arms to the legs of the cross elastomer mount. The elastomer mount is used to create an offset in the compression path through the mount by a bowing or arcing of the legs of the cross elastomer mount in the presence of a downward displacement caused by shocks or vibrations. The bowing or arcing of the legs of the cross elastomer mount allows the cross elastomer mount to provide tension and shearing resistance to shocks and vibrations.

DESCRIPTION OF THE PREFERRED EMBODIMENT

Figure 1:
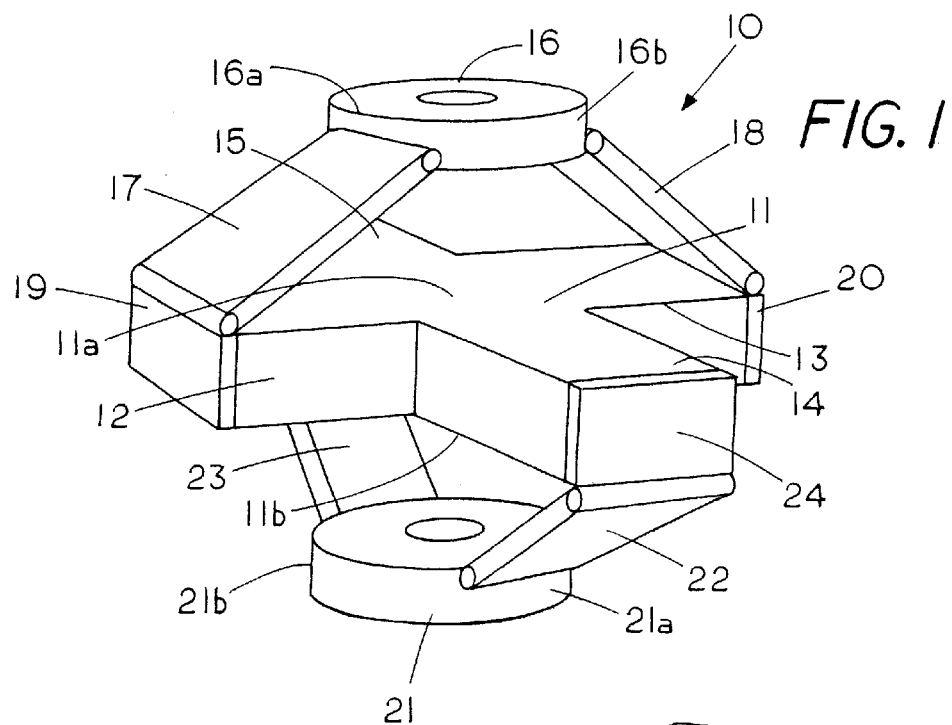
FIG. 1 shows a perspective view of a cross elastomer mount of the present invention.

Referring to FIG. 1, reference numeral 10 generally identifies a cross elastomer mount of the present invention for supporting a housing member such as a cabinet while attenuating various shocks and vibrations. Reference numeral 11 identifies a mount body composed of an elastomer such as a rubber, plastic, or polyvinyl. Mount body 11 has a first side 11a and a second side 11b. Extending from mount body 11 is a first leg 12, a second leg 13, a third leg 14, and a fourth leg 15, the legs positioned mutually perpendicular to each other.

Located proximate first side 11a of mount body 11 is a first platform 16 having a first attaching area 16a and a second attaching area 16b. Pivotally attached to first attaching area 16a of first platform 16 is a first rigid platform arm 17. Pivotally attached to second attaching area 16b of first platform 16 is a second rigid platform arm 18. First rigid platform arm 17 is pivotally attached to first leg 12 of mount body 11 by a first hinge 19. Second rigid platform arm 18 is pivotally attached to second leg 13 of mount body 11 by a second hinge 20.

In the embodiment shown the ends of rigid arms 17, 18, 22, and 23 are shown with hinges pivotally connecting the rigid arms to the ends of cross elastomer legs 12, 13, 14, and 15; however, if desired the rigid arms could be secured directly to the ends of the legs as the resiliency of the legs can in effect become a living hinge to accommodate the motion of the legs.

Located proximate the second side 11b of mount body 11 is a second platform 21 having a first attaching area 21a and a second attaching area 21b. Pivotally attached to first attaching area 21a of second platform 21 is a third rigid platform arm 22. Pivotally attached to second attaching area 21b of second platform 21 is a fourth rigid platform arm 23. Third rigid platform arm 22 is pivotally attached to third leg 14 of mount body 11 by a third hinge 24. Fourth rigid platform arm 23 is pivotally attached to fourth leg 15 of mount body 11 by a fourth hinge (not shown). The attachment of the rigid platform arms to the legs of cross elastomer mount 11 allows cross elastomer 11 to arc or bow to provide tension and shearing resistance to shock and vibration when supporting a housing.

Figure 2:
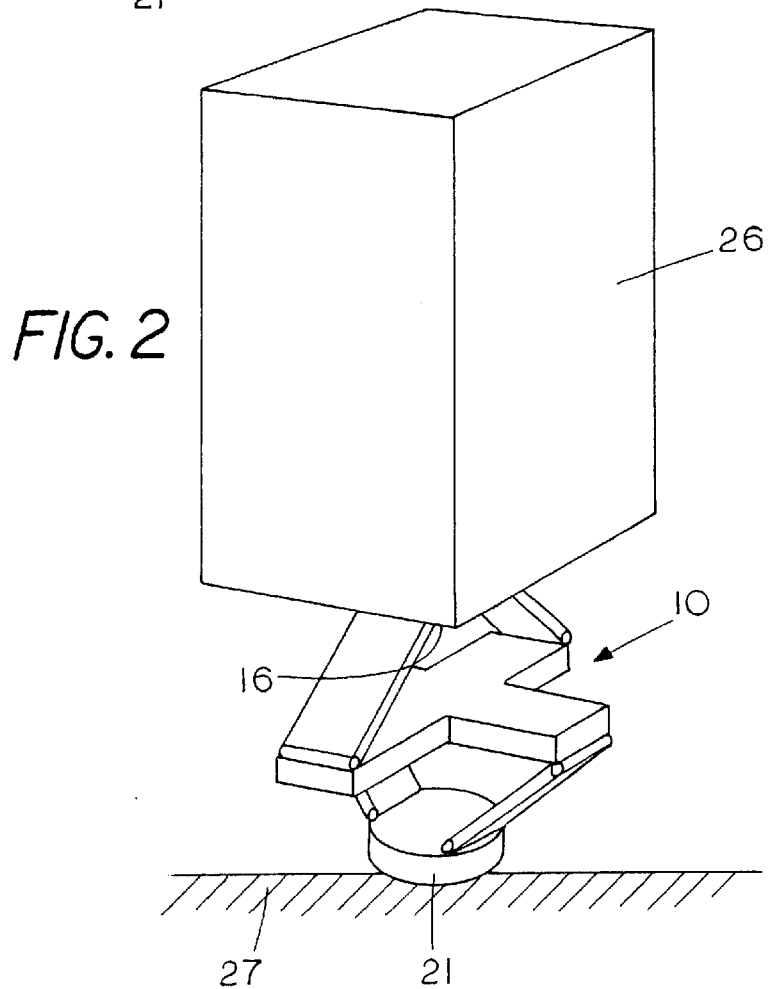
FIG. 2 is a perspective view showing the cross elastomer mount of FIG. 1 supporting a housing.

FIG. 2 is a perspective view showing cross elastomer mount 10 of FIG. 1 supporting a housing 26. As shown, housing 26 is supported by cross elastomer mount 10 by the engagement of first platform 16 with the underside of housing 26 and by the engagement of second platform 21 on a support surface 27. Support surface 27 can be any type of stable surface such as a floor. Although as shown, one cross elastomer mount can be used to support housing 26, additional cross elastomer mounts may also be used to provide a stable platform, the number of mounts can vary based on the load and size of the housing.

Figure 3:
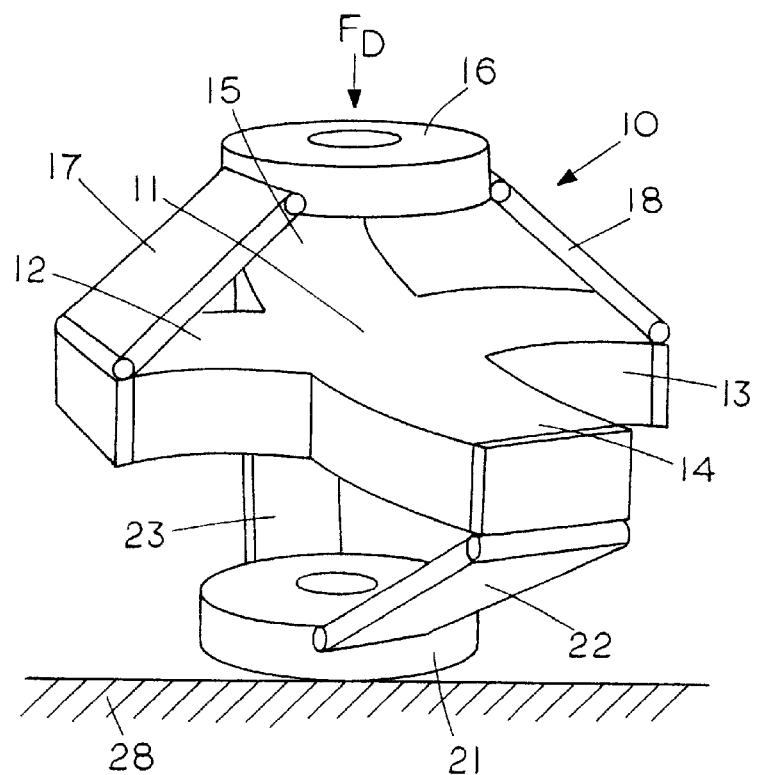
FIG. 3 is a perspective view showing cross elastomer mount of the present invention engaging a support surface and under a tension and shearing force.

FIG. 3 is a perspective view showing cross elastomer mount 10 of the present invention engaging a support surface 28 under a tension and shearing force whereby the legs of mount body 11 provide tension and shearing force resistance to shocks and vibrations. As shown in FIG. 3, the shocks and vibration forces cause a downward displacement of rigid platform arms 17 and 18. The downward displacement of rigid platform arms 17 and 18 results in a downward bowing or arcing of first leg 12 and second leg 13 of cross elastomer mount 10. The downward displacement of first rigid platform arm 17 and second rigid platform arm 18 results in tension and shearing forces in legs 12 and 13. The force on rigid platform arms 22 and 23 causes an upward bowing or arcing of third leg 14 and fourth leg 15 of cross elastomer mount 10. The bowing or arcing of the legs of mount body 11 allow cross elastomer mount 10 to provide tension and shearing resistance to shocks and vibrations.

Figure 4:
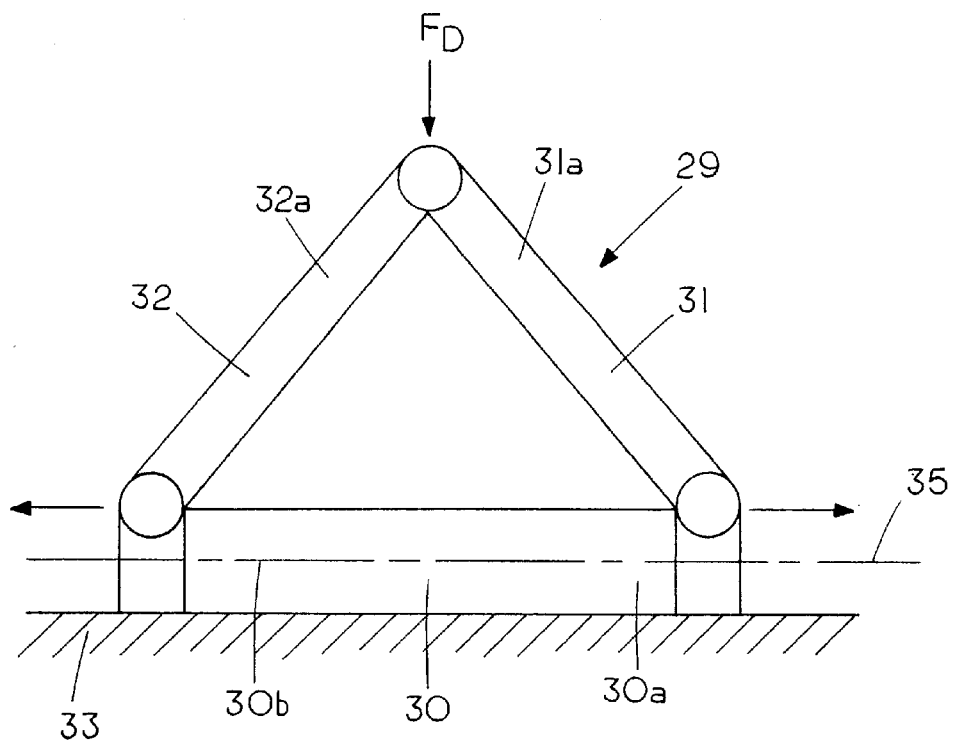
FIG. 4 is a side view showing the effect of a downward displacement on a shock isolator.

FIG. 4 is a side view showing the effect of a downward displacement on a shock isolator 29 having an isolator body 30 composed of an elastomer with a first rigid arm 31 connected to end 30a and a second rigid arm 32 connected to end 30b. Shock isolator 29 is shown on a support surface 33. A longitudinal axis 35 extends through body 30. Unlike the cross elastomer mount of FIG. 1–3 which has two platforms, shock isolator 30 has a support platform formed by the pivotal connection of end 32a of arm 32 and end 31a of arm 31. As shown, isolator body 30 slidably rests on support surface 33. The presence of shocks and vibrational forces $F_D$ causes a downward displacement of rigid platform arms 31 and 32 which causes the lower portion of arms to move laterally along surface 33. The slidable positioning of isolator body 30 to support surface 33 results in tension and shearing forces in isolator body 30 to thereby attenuate the shock and vibration force $F_D$ though the forces are in a direction that is not parallel to the longitudinal axis 35.

Figure 5:
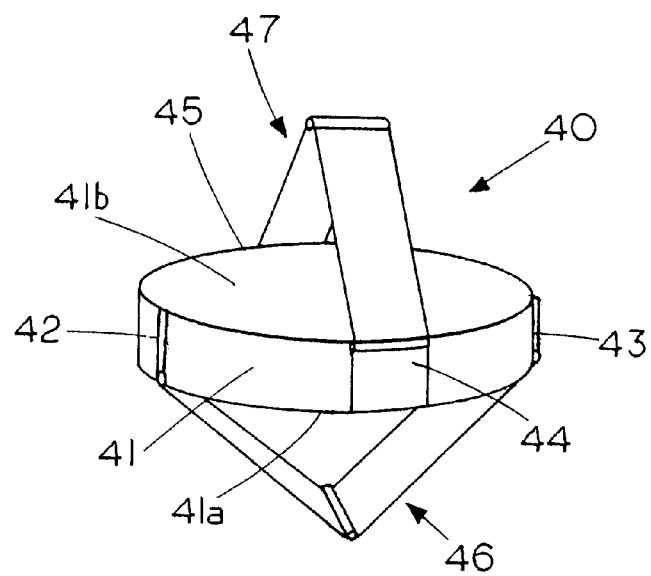
FIG. 5 is a perspective view showing an alternative embodiment of a cross elastomer mount having a circular elastomer body.

FIG. 5 is a perspective view showing an alternative embodiment of a cross elastomer mount 40 having a circular elastomer body 41. Elastomer body 41 has a first side 41a, a second side fourth attaching area 45. Connected to the first attaching area and the second attaching on the a first attaching area 42, a second attaching area 43, a third attaching area 44, and a first side 41a of the elastomer body 41 are a first set of rigid arms 46. Connected to third attaching area 44 and fourth attaching area 45 on the second side 41b of elastomer body 41b is a second set of rigid arms 47. The attachment of the rigid arms to the attaching areas of cross elastomer mount 40 allows circular elastomer body 41 to arc or bow to provide tension and shearing resistance to shock and vibration when supporting a housing or any other types of body.

Figure 6:
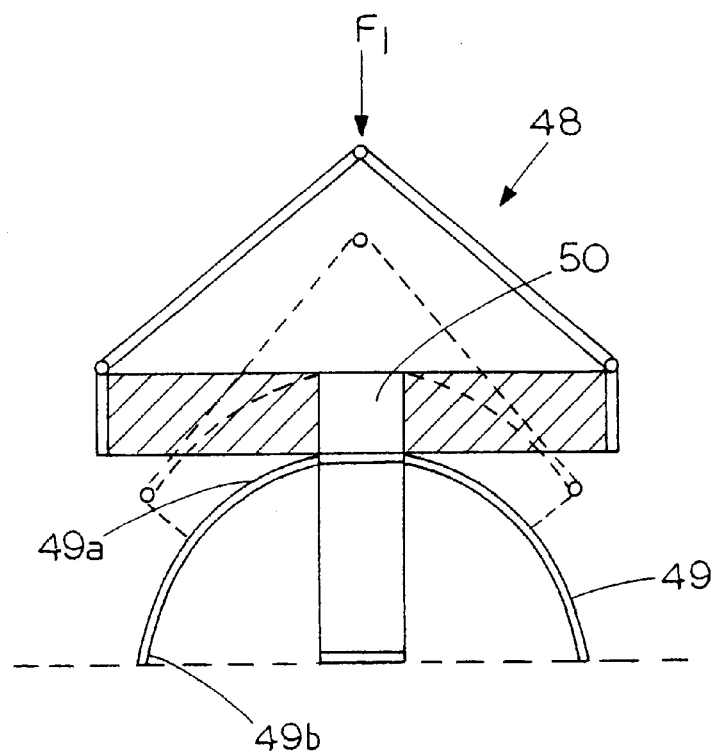
FIG. 6 is a side view of an alternative embodiment of a cross elastomer mount having a semi-circular shaped plate attached to a mount body.

FIG. 6 is a side view of an alternative embodiment of a cross elastomer mount 48 having a semi-circular shaped plate 49 attached to a mount body 50. Semi-circular shaped plate 49 has a polar region 49a and a base region 49b. Mount body 50 is attached to the polar region 49a of semi-circular shaped plate 49. The use of semi-circular shaped plate 49 forces the center point of mount body 50 to remain in position whereby, as shown by the dashed lines, a shock or vibrational force $F_1$ results in the semi-circular shaped plate 49 forcing the elastomer body 50 into shear.

The present invention also includes a method of damping dynamic forces comprising the steps of: (1) forming a cross elastomer mount 10 having a first rigid platform 16 for supporting a first member such as a cabinet housing 26 and a second rigid platform 21 for resting on a second member such as a support surface 27, and having a plurality of legs 12, 13, 14, 15 that are mutually perpendicular to each other; (2) securing the first platform to a first member such as a cabinet housing 26; and (3) mounting the second platform 26 to a second member such as a support surface 27 whereby the cross elastomer mount 10 through elongation of the legs 12, 13, 14, and 15 provides tension and shearing resistance to shocks and vibrations.

We claim;

1. A shock isolator comprising:

a. an isolator body composed of an elastomer, said isolator body having a first side and a second side, said isolator body having a first leg, a second leg, a third leg, and a forth leg;

b. a first platform, said first platform having a first attaching area and a second attaching area, said first platform for supporting a first member proximate the first side of said isolator body;

c. a second platform, said second platform having a first attaching area and a second attaching area, said second platform supporting a second member proximate the second side of said isolator body; and d. a first rigid platform arm and a second rigid platform arm, said first rigid platform arm having a first end pivotally connected to the first attaching area of said first platform and a second end connected to said first leg, said second rigid platform arm having a first end pivotally connected to the second attaching area of said first platform and a second end connected to said second leg whereby the first leg and the second leg bow or arc under a shock and vibrational force to allow a cross elastomer mount to attenuated the shock and vibrational force while providing a tension and shearing resistance to the shocks and vibrational forces.

2. The shock isolator of claim 1 wherein the first leg of said isolator body and the second leg of said isolator body have the same length.

3. The shock isolator of claim 1 including a third rigid platform arm and a fourth rigid platform arm, said third rigid platform arm pivotally connected to the first attaching area of said second platform, said fourth rigid platform arm pivotally connected to the second attaching area of said second platform.

4. The shock isolator of claim 1 including a first hinge and a second hinge, said first hinge pivotally connecting the first leg of said isolator body to said first rigid platform arm and said second hinge pivotally connecting the second leg of said isolator body to said second rigid platform arm.

5. The shock isolator of claim 4 wherein said first platform and said second platform have a circular shape.

6. The shock isolator of claim 4 wherein the platforms are composed of a rigid material.

7. A cross elastomer mount comprising:
a. a mount body composed of an elastomer, said mount body having a first side and a second side, said mount body having a first leg, a second leg, a third leg, and a fourth leg;
b. a first platform, said first platform having a first attaching area and a second attaching area, said first platform for supporting a first member proximate the first side of said mount body;
c. a second platform, said second platform having a first attaching area and a second attaching area, said second platform for supporting a second member proximate the second side of said mount body;
d. a first rigid platform arm, a second rigid platform arm, a third rigid platform arm, and a fourth rigid platform arm, said first rigid platform arm pivotally connected to the first attaching area of said first platform, said second rigid platform arm pivotally connected to the second attaching area of said first platform, said third rigid platform arm pivotally connected to the first attaching area of said second platform, said fourth rigid platform arm pivotally connected to the second attaching area of said second platform; and
e. a first hinge, a second hinge, a third hinge, and a fourth hinge, said first hinge pivotally connecting the first leg of said mount body to said first rigid platform arm, said second hinge pivotally connecting the second leg of said mount body to said second rigid platform arm, said third hinge pivotally connecting the third leg of said mount body to said third rigid platform arm, and said fourth hinge pivotally connecting the fourth leg of said mount body to said fourth rigid platform arm whereby the legs of said cross elastomer mount elongate to provide tension and shearing resistance to a shock force or a vibration force.

8. The cross elastomer mount of claim 7 wherein the first leg, the second leg, the third leg, and the fourth leg of said mount body are of equal length.

9. The cross elastomer mount of claim 7 wherein at least one of said platforms has a circular shape.

10. The cross elastomer mount of claim 7 wherein the platforms are composed of a rigid material.

11. An elastomer shock isolator comprising:
a. an elastomer body having a first and a second spaced apart surfaces, said first surface having a first and a second spaced apart attachment area thereon, said second surface having a third and a fourth spaced apart attachment area thereon wherein a straight line between said first attachment area and said second attachment area would extend crosswise with respect to a straight line between said third attachment area and said fourth attachment area;
b. a first rigid arm having a first end attachment to said first attachment area and a second rigid arm having a first end attachment to said second attachment area wherein said first and second rigid arms are angled toward each other;
c. a third rigid arm having a first end attached to said third attachment area and a fourth rigid arm having a first end attached to said fourth attachment area wherein said third and fourth rigid arms are angled toward each other;
d. a first linking means for linking a second end of said first rigid arm and said second end of said second rigid arm to allow said first and second rigid arms to move as a unit; and
e. a second linking means for linking a second end of said third rigid arm and said second end of said fourth rigid arm to allow said third and said fourth rigid arms to move as a unit.

12. The elastomer shock isolator as claimed in claim 11 wherein said first and second surfaces are substantially circular in shape and each of said crosswise lines would lie in the plane of one of said surfaces.

13. The elastomer shock isolator as claimed in claim 12 wherein said crosswise lines would be substantially perpendicular.

14. The elastomer shock isolator as claimed in claim 11 wherein said first and second linking means each comprise an elongated linking member with a first and a second spaced apart connection areas thereon, wherein said first connection area of each of said linking members is connected to the second end of one of said rigid arms and said second connection area of said linking member is connected to the second end of the other one of said rigid arms which are angled toward each other and which move as a unit.

15. An elastomer shock isolator as claimed in claim 14 wherein the first and second surfaces of said elastomer body are formed into the shape of cross where the segments of the cross project along said crosswise lines.

16. The elastomer shock isolator as claimed in claim 15 wherein said crosswise lines would be substantially perpendicular.

* * * * *